United States Patent [19]

Watanabe et al.

[11] Patent Number: 4,654,404

[45] Date of Patent: Mar. 31, 1987

[54] OIL-RESISTANT RUBBER COMPOSITION

[75] Inventors: Noboru Watanabe; Yoichiro Kubo, both of Yokohama; Tsuyoshi Nakagawa; Hideyoshi Shimoda, both of Kamakura, all of Japan

[73] Assignee: Nippon Zeon Co., Ltd., Tokyo, Japan

[21] Appl. No.: 800,160

[22] Filed: Nov. 20, 1985

[30] Foreign Application Priority Data

Nov. 21, 1984 [JP] Japan .................................. 59-246693

[51] Int. Cl.4 ............................ C08L 9/02; C08L 9/04
[52] U.S. Cl. ...................................... 525/315; 524/205
[58] Field of Search ................. 524/205, 209; 525/315

[56] References Cited

U.S. PATENT DOCUMENTS

| | | | |
|---|---|---|---|
| 4,350,706 | 9/1982 | Oyama et al. | 525/233 |
| 4,404,329 | 9/1983 | Maeda et al. | 525/329.2 |
| 4,405,756 | 9/1983 | Oyama et al. | 525/237 |
| 4,421,884 | 12/1983 | Oyama et al. | 525/315 |
| 4,486,480 | 12/1984 | Okumoto et al. | 524/205 |
| 4,559,390 | 12/1985 | Watanabe et al. | 525/349 |
| 4,560,729 | 12/1985 | Watanabe et al. | 525/315 |

*Primary Examiner*—Allan M. Lieberman
*Attorney, Agent, or Firm*—Sherman and Shalloway

[57] ABSTRACT

A heat-resistant and oil-resistant rubber composition comprising a nitrile group-containing rubber having an iodine value of not more than 120 and a nitrile group-containing liquid polymer having an iodine value of not more than 120.

8 Claims, No Drawings

OIL-RESISTANT RUBBER COMPOSITION

This invention relates to a heat-resistant and oil-resistant rubber composition having excellent high-temperature flex fatigue resistance comprising a nitrile group-containing rubber having a low concentration of unsaturated double bonds and a nitrile group-containing liquid copolymer having a low concentration of unsaturated double bonds.

A nitrile group-containing highly saturated rubber resulting from hydrogenating a part or the whole of monomer units containing carbon-carbon double bonds in a nitrile group-containing rubber such as an acrylonitrile/butadiene copolymer rubber (to be sometimes abbreviated as NBR) or replacing a part or the whole of said monomer units with other ethylenically unsaturated monomers is a rubber having excellent ozone resistance, heat resistance and oil resistance.

However, when the nitrile group-containing highly saturated rubber is crosslinked with an organic peroxide as a curing system, the vulcanizate generally has poor flex fatigue resistance. An attempt has been made to remedy this defect by using an organic peroxide having a specific structure as the vulcanization system. But once cracking occurs in the resulting vulcanizate, it will be broken within a very short period of time, and for use as important safety parts, it should still be improved.

On the other hand curing the aforesaid rubber with a sulfur vulcanization system gives a vulcanizate having good flex fatigue resistance which is widely used as hoses and diaphragms. This vulcanizate, however, is not entirely satisfactory in flex crack resistance at high temperatures, and still requires improvement.

With the recent advance in technology, the requirement for heat resistance, flex fatigue resistance, sliding seal resistance, etc. has become increasingly rigorous in various rubber component parts. Furthermore, to secure freedom from maintenance, they have also been required to have long service lives, cracking resistance at high temperature, crack growth resistance at high temperatures, etc.

U.S. Pat. No. 4,421,884 proposes a rubber composition prepared by using a blend of a partially hydrogenated unsaturated nitrile/conjugated diene polymer rubber and a liquid nitrile group-containing copolymer. This composition, however, cannot fully meet the aforesaid requirement, and a further improvement is strongly desired.

It is an object of this invention to provide an oil-resistant and heat-resistant rubber composition capable of giving a vulcanized rubber having excellent flex crack resistance and solvent crack resistance at room temperature and high temperatures.

According to this invention, this object is achieved by a rubber composition comprising a nitrile group-containing rubber having an iodine value of not more than 120 and a nitrile group-containing liquid polymer having an iodine value of not more than 120.

The nitrile group-containing rubber used in this invention usually contains 5 to 60% by weight of nitrile group-containing monomer units in view of the need for oil resistance, and depending upon uses (the medium with which it makes contact), the content of the nitrile group-containing monomer units may be properly selected from this range.

To secure heat resistance, the nitrile group-containing rubber should have an iodine value of 0 to 120. If the iodine value exceeds 120, the heat resistance of the rubber composition is reduced. Preferably, the rubber has an iodine value of 0 to 100, especially 0 to 85.

The rubber has a Mooney viscosity ($ML_{1+4}$, 100° C.) of at least 20, preferably at least 40.

Examples of the nitrile group-containing rubber are (1) rubbers obtained by hydrogenating the conjugated diene monomer portion of unsaturated nitrile-conjugated diene copolymer rubbers, (2) unsaturated nitrile/-conjugated diene/ethylenically unsaturated monomer copolymer rubbers, (3) rubbers obtained by hydrogenating the conjugated diene unit portion of unsaturated nitrile/conjugated diene/ethylenically unsaturated monomer copolymer rubbers, and (4) unsaturated nitrile/ethylenically unsaturated monomer copolymer rubbers. Rubbers obtained by hydrogenating rubbery polymers obtained by copolymerizing 5 to 60% by weight of an unsaturated nitrile, 10 to 95% by weight of a conjugated diene monomer and 0 to 85% by weight of an ethylenically unsaturated monomer copolymerizable with these monomers are preferred as the rubbers (1) and (3). Rubbery polymers obtained by copolymerizing 5 to 60% by weight of an unsaturated nitrile, 0 to 30% by weight of a conjugated diene monomer and 10 to 95% by weight of an ethylenically unsaturated monomer copolymerizable with these monomers are preferred as the rubbers (2) and (4).

These nitrile group-containing rubbers may be obtained by usual polymerization techniques and usual hydrogenation methods. Needless to say, the methods of producing these rubbers are not particularly limited in this invention.

Examples of monomers which can be used for the production of the nitrile group-containing rubbers include unsaturated nitriles such as acrylonitrile and methacrylonitrile; conjugated dienes such as 1,3-butadiene, 2,3-dimethylbutadiene, isoprene and 1,3-pentadiene; and ethylenically unsaturated monomers copolymerizable with the above monomers, such as unsaturated carboxylic acids (e.g., acrylic acid, methacrylic acid, itaconic acid and maleic acid and salts thereof such as alkali metal salts and ammonium salts), $C_1$–$C_{12}$ alkyl esters of the above unsaturated carboxylic acid (e.g., methyl acrylate, butyl acrylate and 2-ethylhexyl acrylate), alkoxyalkyl esters of the aforesaid unsaturated carboxylic acids having a $C_1$–$C_4$ alkylene group and a $C_1$–$C_4$ alkyl or alkoxy group (e.g., methoxyethyl acrylate, methoxymethyl acrylate, butoxyethyl acrylate and methoxyethoxyethyl acrylate), unsaturated carboxylic acid amides (e.g., acrylamide or methacrylamide), N-substituted (meth)acrylamides (e.g., N-methylol(meth)acrylamide, N,N'-dimethylol(meth)acrylamide and N-ethoxymethyl(meth)acrylamide), vinyl acetate, and olefins such as ethylene and butene-1.

The unsaturated nitrile/ethylenically unsaturated monomer copolymer rubbers may be those in which the unsaturated monomer units are partly substituted by a non-conjugated diene such as vinyl norbornene, dicyclopentadiene and 1,4-hexadiene.

Specific examples of the rubber (1) are hydrogenated products of a butadiene/acrylonitrile copolymer rubber, an isoprene/butadiene/acrylonitrile copolymer rubber, and an isoprene/acrylonitrile copolymer rubber. Specific examples of the rubber (2) are a butadiene/methyl acrylate/acrylonitrile copolymer rubber, a butadiene/acrylic acid/acrylonitrile copolymer rubber and a butadiene/ethylene/acrylonitrile copolymer rubber. Specific examples of the rubber (3) are rubbers obtained by hydrogenating the rubbers (2). Specific examples of the rubbers (4) are a butyl acrylate ethoxyethyl acrylate/vinyl chloroacetate/acrylonitrile copolymer rubber, a butyl acrylate/ethoxyethyl acrylate/vinyl norbornene/acrylonitrile copolymer rubber, and an ethylene/ethyl acrylate/acrylonitrile copolymer rubber.

The nitrile group containing liquid polymer used in this invention preferably contains 5 to 70% by weight, particularly 10 to 50% by weight, of nitrile group-containing monomer units in order to obtain good compatibility with the nitrile group-containing hydrocarbon rubbers and to obtain a rubber composition capable of giving a vulcanizate having superior oil resistance, and solvent crack resistance. In view of the heat resistance and flex fatigue resistance of the vulcanizate, the liquid polymer preferably has an iodine value of not more than 120, especially 0 to 100.

Examples of the nitrile group-containing liquid polymer include (1) rubbers obtained by hydrogenating the conjugated diene unit portion of unsaturated nitrile/-conjugated diene copolymers, (2) unsaturated nitrile/-conjugated diene/ethylenically unsaturated monomer copolymers, (3) rubbers obtained by hydrogenating the conjugated diene unit portion of unsaturated nitrile/-conjugated diene/ethylenically unsaturated monomers, and (4) unsaturated nitrile/ethylenically unsaturated monomer copolymers. Rubbers obtained by hydrogenating liquid polymers obtained by copolymerizing 5 to 70% by weight of an unsaturated nitrile, 10 to 95% by weight of a conjugated diene monomer, and 0 to 85% by weight of an ethylenically unsaturated monomer copolymerizable with these monomers are preferred as the liquid polymers (1) and (3). Liquid polymers obtained by copolymerizing 5 to 70% by weight of an unsaturated nitrile, 0 to 30% by weight of a conjugated diene monomer and 10 to 95% by weight of an ethylenically unsaturated monomer copolymerizable with these monomers are preferred as the liquid polymers (2) and (4).

These liquid polymers may have a functional group such as an amino group, a mercapto group, a hydroxyl group, a carboxyl group or bromine at the terminals of the molecular chain.

These liquid polymers have a number average molecular weight of preferably 500 to 10,000, more preferably 700 to 8,000. If the number average molecular weight is less than 500, the liquid polymer readily undergoes extraction with solvents and flex fatigue resistance and solvent crack resistance of the resulting vulcanizate can be improved only to a small extent. If it exceeds 10,000, the flex fatigue resistance of the vulcanizate is reduced.

The liquid polymer is obtained by using ordinary polymerization techniques and ordinary hydrogenation methods. It should be noted however that the method of producing the liquid polymers in this invention is not particularly restricted.

The iodine values of the polymers used in this invention are determined in accordance with the method of JIS K-0070.

The rubber composition of this invention is composed of 99 to 40% by weight of (1) the nitrile group-containing rubber and 1 to 60% by weight of (2) the nitrile group-containing liquid polymer. If the amount of the liquid polymer used is less than 1% by weight, the flex fatigue resistance of the vulcanizate is not improved. If it exceeds 60% by weight, the viscosity of the rubber composition is reduced and the properties, such as compression set, of the vulcanizate are adversely affected. The two components (1) and (2) may be mixed in the form of latices or in a solvent, or by means of a mixer such as a roll or Banbury mixer.

The rubber composition of this invention is prepared by mixing the two components in a conventional manner together with various ordinary compounding agents used in the rubber industry. The types and amounts of the compounding agents are determined depending upon the ultimate use to which the rubber composition will be put. Examples of ordinary compounding agents are sulfur vulcanization systems comprising sulfur, sulfur-donating compounds such as tetramethylthiuram disulfide, zinc oxide, stearic acid, various vulcanization accelerators (such as guanidines, thiazoles, thiurams and dithiocarbamates), etc.; organic peroxide vulcanization systems comprising dicumyl peroxide, 2,5-dimethyl-2,5-di(t-butylperoxy) hexyne-3, etc.; reinforcing agents or fillers such as carbon black of various grades (e.g., HAF and FEA), silica, talc and calcium carbonate; plasticizers; process oils; processing aids; and antioxidants.

Since the rubber composition of this invention has improved flex fatigue resistance and sliding seal resistance in addition to having ozone resistance, heat resistance and oil resistance which are characteristic of the nitrile group-containing highly unsaturated rubber, it can be used effectively for the production of rubber products which are used in contact with various oils and gases and thus require heat resistance and oil resistance, particularly rubber products which require flex fatigue resistance and sliding seal resistance.

Accordingly, the rubber composition of this invention is useful, for example, for the production of O-rings used in bearings of rotating machines and appliances; various sealing rubber products such as packings and gaskets; various belts such as conveyor belts and timing belts; valves and valve sealing agents; packers, well head seals, blow out preventers (BOP), and bladders used in oil wells; various cushioning and antivibratory materials; bearing seals for ships and automobiles such as crank shaft seals, bearing seals, rotary seals for axles and stern tube seals; various diaphragms, hoses such as marine hoses, risers and flow lines; and rubber products used in the field of energy creation such as geothermal power generation.

The following examples illustrate the present invention more specifically.

EXAMPLE OF PRODUCING LIQUID POLYMERS

In accordance with the polymerization recipe shown in Table 1, the monomers were reacted in a 10-liter autoclave at 35° C. until the conversion of the monomers reached at least 85 %. After the reaction, a phenolic antioxidant was added to the latex, and the latex was coagulated with a sulfuric acid aqueous solution of aluminum sulfate. The coagulum was washed with water, and dried in a dryer under reduced pressure to give a liquid polymer.

The resulting liquid polymer was dissolved in methyl isobutyl ketone, and in a pressure vessel, the butadiene unit portion of the polymer was partially hydrogenated in the presence of a Pd-carbon catalyst to prepare partially hydrognated liquid polymers having various iodine values.

The combined acrylonitrile content (% by weight) of each of the liquid polymers was measured by the Kjeldahl method, and its number average molecular weight was measured by the ebullioscopic method. The properties of these polymers are shown in Table 2.

TABLE 1

| Polymerization recipe (parts by weight) | |
|---|---|
| Monomers (see Table 2) | 100 |
| Water | 250 |
| Sodium dibutylnaphthalene-sulfonate | 3.0 |
| Sodium dodecylbenzene-sulfonate | 1.0 |
| Sodium sulfate | 0.2 |
| Sulfuric acid | 0.1 |
| Potassium persulfate | 0.5 |
| t-Dodecylmercaptan | variable (see Table 2) |

TABLE 2

| | Polymerization conditions | | | Properties of the polymer | | |
|---|---|---|---|---|---|---|
| | Monomers charged | | t-dodecyl | Bound acrylonitrile | Number average | |
| Sample No. | Acrylonitrile | Butadiene | Methacrylic acid | mercaptan charged | content (wt. %) | molecular weight | Iodine value |
| A | 42 | 55 | 3 | 10.0 | 40.6 | 2140 | Described |
| B | 45 | 55 | 0 | 12.0 | 43.3 | 1930 | in |
| C | 45 | 51 | 4 | 11.0 | 43.5 | 1880 | Examples |
| D | 42 | 55 | 3 | 20.0 | 40.8 | 890 | |
| E | 42 | 43 | 15 | 10.0 | 40.2 | 1970 | |
| F | 33 | 64 | 3 | 3.5 | 31.0 | 860 | |
| G | 33 | 63* | 4 | 2.0 | 31.4 | 1870 | |
| H | 33 | 62 | 5** | 2.0 | 31.2 | 2010 | |

*Isoprene was used in place of butadiene.
**Acrylic acid was used in place of methacrylic acid.

EXAMPLE 1

Three partially hydrogenated NBR rubbers having an iodine value of 150, 104 and 51 respectively and a Mooney viscosity ($ML_{1+4}$, 100° C.) of 40 were prepared by dissolving an acrylonitrile/butadiene copolymer rubber (NBR for short; iodine value=260) having a bound acrylonitrile content of 41% by weight in methyl isobutyl ketone, and the butadiene portion of the copolymer has partially hydrogenated in a pressure vessel using a Pd-carbon catalyst.

Liquid polymer A (iodine value-260 or 86) shown in the Production Example was mixed with hydrogenated NBR in the proportions shown in Table 4 on a cooled roll. Then, in accordance with the compounding recipe shown in Table 3, the various compounding agents were added to form a rubber compound stock. The stock was heated under pressure at 160° C. for 20 minutes to obtain a vulcanizate.

The NBR (iodine value=260) used in evaluating the properties of the vulcanizate had a Mooney viscosity of 40.

TABLE 3

| Compounding recipe (parts by weight) | |
|---|---|
| Rubbers (see Table 4) | 100 |
| Stearic acid | 1 |
| Zinc oxide (#3) | 5 |
| Sulfur | 0.5 |
| SRF carbon black | 80 |
| Plasticizer [di-(butoxyethoxyethyl)adipate] | 20 |
| Tetramethylthiuram disulfide | 2 |
| 2-Mercaptobenzothiazole | 0.5 |
| N—phenyl-N′—isopropyl p-phenylenediamine | 1 |

TABLE 3-continued

| Compounding recipe (parts by weight) | |
|---|---|
| Octylated diphenylamine | 1 |

The properties of the vulcanizate were measured in accordance with JIS K-6301.

The flex cracking test was carried out in accordance with JIS K-6301 by using a de Mattia flexing tester, and the number of flexings until cracking was measured.

The results are shown in Table 4.

TABLE 4

| | Run No. | | | | | | | |
|---|---|---|---|---|---|---|---|---|
| | Comparison | | | | | | Invention | |
| | 1 | 2 | 3 | 4 | 5 | 6 | 7 | 8 |
| NBR | | | | | | | | |
| Iodine number 260 | 100 | | 80 | 80 | | | | |
| Iodine number 150 | | | | | 80 | | | |
| Iodine number 104 | | | | | | 80 | 80 | |
| Iodine number 51 | | 100 | | | | | | 80 |
| Liquid polymer (A) | | | | | | | | |
| Iodine Value 260 | — | — | 20 | — | — | 20 | — | — |
| Iodine value 86 | — | — | — | 20 | 20 | — | 20 | 20 |
| Properties of the vulcanizate | | | | | | | | |
| Tensile strength (kg/cm²) | 159 | 172 | 134 | 125 | 133 | 169 | 157 | 144 |
| Elongation (%) | 540 | 510 | 640 | 620 | 580 | 700 | 700 | 710 |
| Hardness (JIS) | 64 | 69 | 58 | 57 | 60 | 59 | 62 | 64 |
| Heat aging test (test tube method, 150° C. × 168 hours) | | | | | | | | |
| Percent change in tensile strength | −40 | −7 | −44 | −40 | −38 | −14 | −8 | −9 |
| Percent change in elongation | −85 | −21 | −84 | −79 | −80 | −35 | −22 | −12 |
| Hardness (point) | +21 | +5 | +19 | +16 | +17 | +10 | +8 | +7 |
| de Mattia flexing test (number of flexings until | | | | | | | | |

TABLE 4-continued

| | Run No. | | | | | | | |
|---|---|---|---|---|---|---|---|---|
| | Comparison | | | | | | Invention | |
| | 1 | 2 | 3 | 4 | 5 | 6 | 7 | 8 |
| cracking) | | | | | | | | |
| Room temperature (× $10^4$) | 10 | 15 | 80 | 90 | 80 | 85 | 7300 | 7300 |
| 150° C. (× $10^4$) | 1 | 3 | 20 | 25 | 20 | 22 | 150 | 165 |

The results given in Table 4 demonstrate that the composition composed of the non-hydrogenated NBR and the liquid polymer (A) having an iodine value within the scope of the invention and the composition composed of the hydrogenated NBR having an iodine value within the scope of the invention and the liquid polymer (A) having an iodine outside the scope of the invention cannot achieve the object of this invention, whereas the compositions in accordance with this invention lead to a great improvement in the flex fatigue resistances of the vulcanizates at room and high temperatures and their heat resistances.

EXAMPLE 2

In the same way as in Example 1, hydrogenated NBR having an iodine value of 99 was prepared by partially hydrogenating NBR having a bound acrylonitrile content of 34% by weight and an iodine value of 295, and also partially hydrogenated NBR having an iodine value of 112 was prepared by hydrogenating NBR having a bound acrylonitile content of 50% by weight and an iodine value of 215.

By usual emulsion polymerization, a terpolymer of butadiene/butyl acrylate/acrylonitrile (61/5/34, % by weight) having an iodine value of 270 [to be referred to as NBBR I)] was prepared. The terpolymer was partially hydrogenated to form a partially hydrogenated product having a iodine value of 65 ( [to be referred to as NBBR (II)].

Each of these rubbery polymers was mixed with the liquid polymer (A) having an iodine value of 108 in a mixing ratio of 80/20 by weight on a cooled roll. The compounding agents indicated in Table 3 were mixed on a cold roll. Furthermore, the compounding agents indicated in Table 3 were mixed on the cold roll to form a rubber compound stock. The stock was heated at 160° C. under pressure for 20 minutes. The vulcanizate was tested in the same way as in Example 1.

The solvent crack resistance was measured by the following method.

Two indicator lines were drawn widthwise 2 mm apart from each other at a central part of a rectangular test specimen having a width of 10 mm, a length of 100 mm and a thickness of 2 mm. Midway between the indicator lines, a cut with a width of 2 mm was provided parallel to the indicator lines and extending to the back of the specimen by using a razor. The test specimen was secured to a jig capable of stretching the specimen to a desired length. Then, the specimen was dipped in a test solvent at 60° C., and the time which elapsed until the test specimen broke was measured.

The results are shown in Table 5.

TABLE 5

| | | Run No. | | | | | | | |
|---|---|---|---|---|---|---|---|---|---|
| | | Comparison | | | | | Invention | | |
| | | 9 | 10 | 11 | 12 | 13 | 14 | 15 | 16 |
| | Iodine value | | | | | | | | |
| NBR (34) | 295 | 100 | | 80 | | | | | |
| NBR (34) | 99 | | 100 | | | | | | 80 |
| NBR (50) | 215 | | | | 80 | | | | |
| NBR (50) | 112 | | | | | | 80 | | |
| NBBR (I) | 270 | | | | | 80 | | | |
| NBBR (II) | 65 | | | | | | | 80 | |
| Liquid polymer (A) (108) | | 0 | 0 | 20 | 20 | 20 | 20 | 20 | 20 |
| Properties of the vulcanizate | | | | | | | | | |
| Tensile strength (kg/cm$^2$) | | 148 | 161 | 122 | 131 | 144 | 173 | 164 | 180 |
| Elongation (%) | | 530 | 500 | 640 | 610 | 590 | 680 | 690 | 590 |
| Hardness (JIS) | | 67 | 72 | 59 | 61 | 59 | 62 | 63 | 61 |
| Heat aging test (test tube method, 150° C. × 168 hours) | | | | | | | | | |
| Percent change in tensile strength | | −42 | −10 | −41 | −38 | −39 | −10 | −11 | −9 |
| Percent change in elongation | | −88 | −30 | −69 | −70 | −70 | −18 | −19 | −19 |
| Hardness (point) | | +20 | +7 | +15 | +16 | +15 | +7 | +6 | +8 |
| de Mattia flex test (number of flexings until cracking) | | | | | | | | | |
| Room temperature (× $10^4$) | | 9 | 13 | 70 | 65 | 88 | >300 | >300 | >300 |
| 150° C. (× $10^4$) | | 0.9 | 2 | 24 | 21 | 29 | 160 | 140 | 200 |
| Solvent crack resistance (time in seconds until breakage) | | | | | | | | | |
| isooctane/toluene (40/60) | | 19 | 78 | 320 | 390 | 620 | 4,800 | 6,500 | 6,100 |
| Toluene | | 16 | 51 | 118 | 131 | 380 | 2,200 | 3,350 | 3,200 |
| Trichloroethylene | | 4 | 24 | 59 | 49 | 67 | 508 | 721 | 711 |
| ASTM #3 oil | | 87 | 372 | 486 | 1,010 | 1,130 | 3,300 | 3,720 | 3,490 |

(Note)
The parenthesized figures show the bound acrylonitrile contents (wt. %).

It is seen from the results given in Table 5 that the vulcanizates obtained from the compositions of this invention have greatly improved high-temperature flex (crack) resistance, and surprisingly, their solvent crack resistances are improved at the same time.

EXAMPLE 3

Partially hydrogenated NBR having an iodine value of 104 was prepared by hydrogenating NBR having a bound acrylonitrile content of 41% by weight and an iodine value of 260 in the same way as in Example 1. The resulting partially hydrogenated NBR was mixed with each of the partially hydrogenated products (see Table 6 for the iodine values) of the partially hydrogenated liquid polymers (B to H) prepared in the Production Example to prepare a rubber composition (see Table 6). The composition was cured in the same way as in Example 1, and the properties of the vulcanizate were measured in the same way as in Example 1. The results are shown in Table 6.

TABLE 8

| | Run No. | | | | |
|---|---|---|---|---|---|
| | Comparison | | | | Invention |
| | 28 | 29 | 30 | 31 | 32 |
| NBR Iodine value | | | | | |
| 260 | 100 | | 80 | | |
| 99 | | 100 | | 80 | 80 |
| Liquid polymer (A) Iodine value | | | | | |
| 240 | | | 20 | 20 | |
| 99 | | | | | 20 |
| Properties of the vulcanizate | | | | | |
| Tensile strength (kg/cm²) | 189 | 188 | 145 | 184 | 192 |

TABLE 6

| | | Run No. | | | | | | | | | | |
|---|---|---|---|---|---|---|---|---|---|---|---|---|
| | | Comparison | | | Invention | | | | | | | |
| | | 17 | 18 | 19 | 20 | 21 | 22 | 23 | 24 | 25 | 26 | 27 |
| NBR | Iodine value | | | | | | | | | | | |
| | 260 | 80 | 80 | 80 | | | | | | | | |
| | 104 | | | | 80 | 80 | 90 | 70 | 60 | 70 | 70 | 70 |
| Liquid polymer | | 20 | 20 | 20 | 20 | 20 | 10 | 30 | 40 | 30 | 30 | 30 |
| | Type | (B) | (B) | (C) | (B) | (C) | (D) | (D) | (F) | (F) | (G) | (H) |
| | Iodine value | 240 | 109 | 116 | 109 | 116 | 97 | 65 | 88 | 111 | 105 | 104 |
| Properties of the vulcanizate | | | | | | | | | | | | |
| Tensile strength (kg/cm²) | | 169 | 154 | 172 | 148 | 162 | 164 | 151 | 153 | 171 | 163 | 159 |
| Elongation (%) | | 540 | 610 | 620 | 590 | 630 | 710 | 700 | 680 | 700 | 700 | 720 |
| Hardness (JIS) | | 62 | 63 | 66 | 61 | 56 | 62 | 60 | 59 | 62 | 63 | 61 |
| Heat aging test (test tube method, 150° C. × 168 hours) | | | | | | | | | | | | |
| Percent change in tensile strength | | −48 | −32 | −54 | −10 | −9 | −10 | −10 | −9 | −8 | −7 | −7 |
| Percent change in elongation | | −86 | −74 | −91 | −28 | −26 | −23 | −28 | −26 | −24 | −26 | −18 |
| Hardness (point) | | +20 | +18 | +19 | +7 | +6 | +6 | +5 | +7 | +6 | +6 | +7 |
| de Mattia flexing test (number of flexings until cracking) | | | | | | | | | | | | |
| Room temperature (× 10⁴) | | 70 | 75 | 78 | >300 | >300 | 290 | >300 | >300 | >300 | 300 | 300 |
| 150° C. (× 10⁴) | | 15 | 20 | 19 | 140 | 110 | 100 | 180 | 180 | 110 | 170 | 140 |

EXAMPLE 4

In the same way as in Example 1, partially hydrogenated NBR (in the non-hydrogenated state, NBR had an iodine value of 260) having a bound acrylonitrile content of 41% by weight and an iodine value of 99 was prepared in the same way as in Example 1. Using the resulting partially hydrogenated NBR and the liquid polymer (A) having an iodine value of 240 or 84, vulcanizates were prepared in accordance with the compounding recipe shown in Table 7 (vulcanization conditions: 160° C.×20 minutes). The properties of the vulcanizates were tested in the same way as in Example 1, and the results are shown in Table 8

TABLE 7

| Compounding recipe (parts by weight) | |
|---|---|
| Rubbers (indicated in Table 8) | 100 |
| Stearic acid | 1 |
| Zinc oxide (#3) | 5 |
| Sulfur | 0.5 |
| Dicumyl peroxide | 2 |
| SRF carbon black | 80 |
| Plasticizer [di-(butoxyethoxyethyl) adipate] | 20 |

TABLE 8 (continued)

| | 28 | 29 | 30 | 31 | 32 |
|---|---|---|---|---|---|
| Elongation (%) | 610 | 520 | 660 | 650 | 700 |
| Hardness (JIS) | 67 | 69 | 60 | 61 | 64 |
| de Mattia flex test number of flexings until cracking (× 10⁴) | | | | | |
| Room temperature | 8 | 9 | 40 | 39 | >300 |
| 150° C. | 3 | 2 | 10 | 20 | 170 |
| Number of flexings until breakage | | | | | |
| Room temperature | 220 | 200 | 4 × 10⁴ | 7 × 10⁴ | 90 × 10⁴ |
| 150° C. | <10 | <10 | 8,000 | 7,000 | 21 × 10⁴ |

It is seen from the results given in Table 8 that in vulcanization with organic peroxides, the flex fatigue resistance of the vulcanizate (the time which elapsed until cracks formed and the time which elapsed until the vulcanizate broke after growing of the cracks) was greatly improved.

What is claimed is:

1. A heat-resistant and oil-resistant rubber composition comprising:
    (1) 99 to 40% by weight of a nitrile group-containing rubber having an iodine value of not more than 120, a Mooney viscosity of at least 20 and containing 5 to 60% by weight of monomer units containing a nitrile group, and (2) 1 to 60% by weight of a nitrile group-containing liquid polymer having an iodine value of not more than 120, a number average molecular weight of 500 to 10,000 and containing 5 to 70% by weight of nitrile group containing monomer units.

2. The rubber composition of claim 1 wherein the nitrile group-containing liquid polymer contains 10 to 50% by weight of nitrile group-containing monomer units.

3. The rubber composition of claim 1 wherein the nitrile group-containing liquid polymer has an iodine value of 0 to 100.

4. The rubber composition of claim 1 wherein the nitrile group-containing rubber has an iodine value of 0 to 85.

5. The rubber composition of claim 1 wherein the Mooney viscosity of the nitrile group-containing rubber is at least 40.

6. The rubber composition of claim 1 wherein the number average molecular weight of the nitrile group-containing liquid polymer is 700 to 8,000.

7. The rubber composition of claim 1 wherein the rubber is at least one rubber selected from rubbers obtained by hydrogenating the conjugated diene unit portion of unsaturated nitrile-conjugated diene copolymers, unsaturated nitrile/conjugated diene/ethylenically unsaturated monomer copolymers, rubbers obtained by hydrogenating the conjugated diene unit portion of unsaturated nitrile/conjugated diene/ethylenically unsaturated monomer copolymers, and unsaturated nitrile/ethylenically unsaturated monomer copolymers.

8. The rubber composition of claim 1 wherein the liquid polymer is at least one polymer selected from polymers obtained by hydrogenating the conjugated diene unit portion of unsaturated nitrile/conjugated diene copolymers, unsaturated nitrile/conjugated diene/ethylenically unsaturated monomer copolymers, polymers obtained by hydrogenating the conjugated diene unit portion of unsaturated nitrile/conjugated diene/ethylenically unsaturated monomer copolymers, and unsaturated nitrile/ethylenically unsaturated monomer copolymers.

* * * * *